United States Patent
Stolze et al.

(10) Patent No.: US 9,752,275 B2
(45) Date of Patent: Sep. 5, 2017

(54) HOUSEHOLD APPLIANCE, MORE PARTICULARLY A TUMBLE DRYER, COMPRISING A LATENT HEAT STORE, AND METHOD FOR THE OPERATION THEREOF

(71) Applicant: BSH BOSCH UND SIEMENS HAUSGERÄTE GMBH, München (DE)

(72) Inventors: Andreas Stolze, Falkensee (DE); Jörg Waschull, Dresden (DE)

(73) Assignee: BSH Hausgeräte GmbH, Munich (DE)

( * ) Notice: Subject to any disclaimer, the term of this patent is extended or adjusted under 35 U.S.C. 154(b) by 554 days.

(21) Appl. No.: 14/380,186

(22) PCT Filed: Feb. 7, 2013

(86) PCT No.: PCT/EP2013/052445
§ 371 (c)(1),
(2) Date: Aug. 21, 2014

(87) PCT Pub. No.: WO2013/124163
PCT Pub. Date: Aug. 29, 2013

(65) Prior Publication Data
US 2015/0013178 A1    Jan. 15, 2015

(30) Foreign Application Priority Data
Feb. 21, 2012   (DE) .................. 10 2012 202 665

(51) Int. Cl.
*D06F 58/26*   (2006.01)
*D06F 58/02*   (2006.01)
(Continued)

(52) U.S. Cl.
CPC .............. *D06F 58/26* (2013.01); *D06F 58/02* (2013.01); *D06F 58/20* (2013.01); *D06F 58/24* (2013.01);
(Continued)

(58) Field of Classification Search
None
See application file for complete search history.

(56) References Cited

U.S. PATENT DOCUMENTS

| 5,709,041 A | 1/1998 | Tarplee | |
| 5,911,746 A * | 6/1999 | Kuhlenschmidt | ....... F25B 15/02 62/102 |

(Continued)

FOREIGN PATENT DOCUMENTS

| CH | 690 354 | 8/2000 |
| CN | 101835933 | 9/2010 |

(Continued)

OTHER PUBLICATIONS

International Search Report for PCT/EP2013/052445, dated Mar. 17, 2014.

(Continued)

*Primary Examiner* — David J Laux
(74) *Attorney, Agent, or Firm* — Nixon & Vanderhye P.C.

(57) ABSTRACT

A household appliance has a working chamber and at least one latent heat store having a respective storage medium. The storage medium is thermally coupled via a respective associated heat exchanger to a working medium circulating through the working chamber. The working medium moves from the working chamber to a heat sink, from the heat sink to the heat exchanger, from the heat exchanger to a heat source, and from the heat source back to the working chamber. The storage medium forms a substance mixture together with a respective carrier fluid. The substance mix- (Continued)

ture can be conducted in a respective closed circuit through the associated heat exchanger for an exchange of heat with the working medium, and the substance mixture circulates between the associated heat exchanger and at least one reservoir in the respective closed circuit. The reservoir can be refilled layer-by-layer with the substance mixture conducted through the respective associated heat exchanger.

25 Claims, 1 Drawing Sheet

(51) Int. Cl.
*F28D 20/02* (2006.01)
*D06F 58/20* (2006.01)
*D06F 58/24* (2006.01)
*F28D 20/00* (2006.01)
*D06F 39/00* (2006.01)
*A47L 15/42* (2006.01)

(52) U.S. Cl.
CPC ......... *F28D 20/023* (2013.01); *F28D 20/028* (2013.01); *A47L 15/4291* (2013.01); *D06F 39/006* (2013.01); *F28D 2020/0082* (2013.01); *F28D 2020/0095* (2013.01); *Y02E 60/145* (2013.01)

(56) References Cited

U.S. PATENT DOCUMENTS

| | | | |
|---|---|---|---|
| 2011/0173998 A1* | 7/2011 | Coleman | F25B 25/02 62/79 |
| 2011/0209484 A1* | 9/2011 | Krausch | D06F 58/206 62/79 |
| 2012/0017456 A1* | 1/2012 | Grunert | D06F 58/22 34/82 |

FOREIGN PATENT DOCUMENTS

| | | |
|---|---|---|
| CN | 101939479 | 1/2011 |
| DE | 10 2009 046547 | 3/2011 |
| DE | 10 2009 049066 | 4/2011 |
| WO | WO 2011/039251 | 4/2011 |

OTHER PUBLICATIONS

Written Opinion of the ISA for PCT/EP2013/052445, dated Mar. 17, 2014.

* cited by examiner

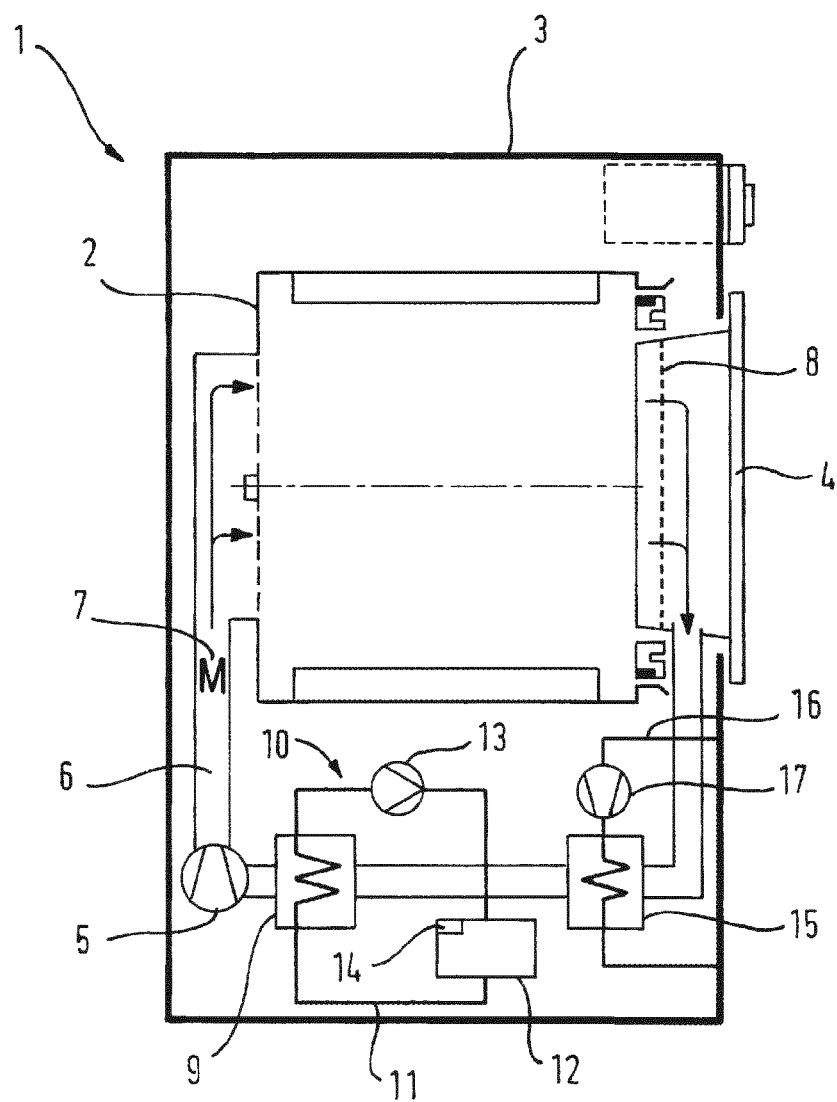

HOUSEHOLD APPLIANCE, MORE PARTICULARLY A TUMBLE DRYER, COMPRISING A LATENT HEAT STORE, AND METHOD FOR THE OPERATION THEREOF

This application is the U.S. national phase of International Application No. PCT/EP2013/052445 filed 7 Feb. 2013 which designated the U.S. and claims priority to DE Patent Application No. 10 2012 202 665.7 filed 21 Feb. 2012 the entire contents of each of which are hereby incorporated by reference.

The invention relates to a household appliance, in particular a tumble dryer, comprising a working chamber and at least one latent heat store, having one storage medium in each instance, the one storage medium in each instance being thermally coupled by way of an associated heat exchanger in each instance to a working medium circulating through the working chamber, wherein working medium passes first from the working chamber to a heat sink, from there to the heat exchanger, from there to a heat source and from there back into the working chamber and wherein the one storage medium in each instance forms a substance mixture together with a carrier fluid in each instance, said substance mixture being able to be conducted in a closed circuit in each instance by way of the associated heat exchanger in each instance for an exchange of heat with the working medium. The invention further relates to a method for operating such a household appliance.

A tumble dryer generally has a working chamber in each instance, which can be filled with laundry items to be dried by way of a front loading opening in a housing of the tumble dryer. A process air guide is then provided, which is designed to supply heated air to the working chamber and then to conduct said air out of the working chamber. In the case of a so-called condensation dryer this air conveyed through the working chamber is conducted in a closed circuit during operation of the condensation dryer, in which closed circuit it is cooled in a heat sink after it leaves the working chamber, in order to condense out and eliminate moisture that is conducted with it, and heated by way of a heat source before entering the working chamber. In the working chamber it absorbs moisture from the laundry items and is then conducted back out of the working chamber and by way of the heat sink to the heat source. The moisture absorbed into the air from the laundry items is then eliminated again at the heat sink, so that the process air heated by way of the heat source can in turn absorb moisture from the laundry items when it is supplied to the working chamber again. The heat sink can be an air/air heat exchanger through which air from the surroundings of the tumble dryer flows. The heat source can be a chemical or electric heater. The heat sink and heat source can also belong to a heat pump, in which heat absorbed from the process air by the heat sink is conveyed to the heat source in order to be emitted back to the process air there.

A similarly known embodiment of a tumble dryer is its design as a so-called exhaust air dryer, in which the previously heated process air, after being conducted through a working chamber of the dryer, is conducted out of the dryer together with the absorbed moisture, generally by way of an exhaust air hose. In this process therefore the heated process air is conveyed once through the damp laundry items in the working chamber and then discharged, in other words not conducted in a closed circuit during operation of the tumble dryer.

Condensation and exhaust air dryers can also be embodied respectively as so-called heat pump dryers, in which as a particular feature a heat pump is provided as set out above, by way of which heat pump the process air is at least partially heated.

A tumble dryer can also be provided with a latent heat store. In this some of the heat in the process air conducted out of the working chamber is stored in a storage medium of the latent heat store as latent heat, so that at least some of the heat contained in the discharged process air can be stored and used again later, for example to heat process air before it enters the working chamber. The energy consumption of a tumble dryer can be reduced by means of such a latent heat store.

According to DE 10 2009 049 066 A1 a two-part latent heat store is provided in a household appliance that can be used as a dryer, in particular a tumble dryer. A temperature difference is generated between the two parts of the latent heat store before the start of a drying process by means of a Peltier element. In the subsequent drying process the cold part of the latent heat store serves as a heat sink to eliminate the moisture from flowing process air and the hot part serves as a heat source to heat the process air from which moisture has been eliminated, said process air flowing in a closed circuit around the items to be dried.

DE 10 2009 046 547 A1 discloses a household appliance embodied as a condensation dryer, which has a working chamber to accommodate laundry items to be dried. Said condensation dryer also has a process air guide, by way of which a working medium in the form of process air is conveyed by means of a fan by way of a heater and conducted into the interior space of the drying chamber, where the heated air absorbs moisture from the laundry therein. The process air is then conducted through a lint filter to a heat exchanger, where the process air is cooled and moisture absorbed in the air is therefore condensed out. The process air is then taken in again by way of the fan and conveyed to the heater in order to be heated again and then be conducted back into the interior space of the working chamber. The heat exchanger here is embodied as an air/air heat exchanger, at which an exchange of heat takes place between the process air and cooling air that has also been conducted past the heat exchanger. The cooling air heated in this process is then conveyed through a latent heat store, where it is cooled due to the transfer of thermal energy to a storage medium of the latent heat store and then conveyed out of the tumble dryer. The storage medium of the latent heat store here is a PCM (phase change material), which can store the thermal energy by means of a phase transition from solid to liquid. The thermal energy absorbed in the latent heat store as latent heat in this heat coupling-in process can be used as part of a heat recovery process to heat the process air when the latent heat store is filled completely, in that the heater is deactivated and the process air is then heated by the transfer of heat from the latent heat store to the working chamber or the process air is preheated by the latent heat store before it reaches the heater and is heated to the desired temperature there. In this process the PCM passes through a phase transition from liquid to solid, with a heat coupling-in process being started again until the next discharge possibility after complete discharge of the latent heat store.

Based on the prior art described above it is the object of the present invention to provide a more developed household appliance, in which at least one latent heat store with a high level of efficiency and a constant dynamic is provided. A method for operating such a household appliance will also be specified.

This object is achieved in respect of an apparatus based on the preamble of the corresponding independent claim in conjunction with the latter's characterizing features. With regard to a method the object is achieved according to the features of the corresponding independent claim. The following dependent claims in each instance set out advantageous developments of the invention in each instance, advantageous developments of the invention in respect of an apparatus corresponding to advantageous developments in respect of a method and vice versa, even if this is not specifically stated.

According to the invention a household appliance, in particular a tumble dryer, comprises a working chamber and at least one latent heat store, having one storage medium in each instance, the one storage medium in each instance being thermally coupled by way of an associated heat exchanger in each instance to a working medium circulating through the working chamber, wherein working medium passes first from the working chamber to a heat sink, from there to the heat exchanger, from there to a heat source and from there back into the working chamber and wherein the one storage medium in each instance forms a substance mixture together with a carrier fluid in each instance, said substance mixture being able to be conducted in a closed circuit in each instance by way of the associated heat exchanger in each instance for an exchange of heat with the working medium. The one substance mixture in each instance also circulates between the associated heat exchanger in each instance and at least one reservoir in the respective closed circuit and the reservoir can be filled layer by layer with the substance mixture conducted by way of the associated heat exchanger in each instance.

Within the meaning of the invention the storage medium is a PCM (phase change material), which stores or emits thermal energy utilizing the enthalpy of reversible thermodynamic state changes. Capacity for storage here is therefore based on an enthalpy difference during a phase conversion of the PCM from a low temperature phase (e.g. solid) to a high temperature phase (e.g. liquid), said phase conversion taking place at a fixed temperature or in a narrow temperature window. In particular a PCM is used, in which phase transitions are undergone between a solid and liquid state, preferably based on salts, salt hydrates or paraffins. Apart from these however in principle it is also possible to use storage media in which liquid/gaseous, solid/gaseous, amorphous/crystalline, etc. phase transitions take place. As part of a heat coupling-in process thermal energy is then stored, in that it is used for a phase change of the PCM, in other words melting in the case of the solid/liquid phase transition. This stored thermal energy can then be released again as part of a heat recovery process, in that the phase transition of the PCM is undergone in the counter direction. When a PCM with a solid/liquid phase transition is used, during the heat recovery process said PCM changes from a liquid state to a solid phase, thereby releasing thermal energy in the form of heat according to a solidification enthalpy of the PCM.

The invention also comprises the technical doctrine that the storage medium forms a substance mixture with a carrier fluid, said substance mixture being able to be conducted in a closed circuit by way of the associated heat exchanger for an exchange of heat with the working medium. The storage medium is therefore made to exchange heat with the working medium of the household appliance in that a substance mixture formed by the storage medium and a carrier fluid is conducted in a closed circuit by way of the associated heat exchanger. Such an embodiment allows a heat exchange to take place between the storage medium and the working medium of the household appliance directly in the region of the associated heat exchanger so that the efficiency of the latent heat store is improved by this direct heat exchange. Because the latent heat store is formed in principle by the substance mixture made up of carrier fluid and storage medium conducted in the closed circuit, a phase change in the storage medium can be undergone directly at the heat exchanger so that a greater part of the thermal energy of the working medium conducted past is also transferred to the storage medium. It is also possible to influence the charging of the latent heat store directly by setting a flow speed of the substance mixture taking place by way of the associated heat exchanger. The constant exchange of the substance mixture, which is always at the same temperature and is conducted by way of the heat exchanger, also produces regular temperature differences in the associated heat exchanger.

Finally the positioning of the latent heat store formed by the substance mixture can always be matched optimally to the space conditions of the household appliance prevailing in each instance, as only the associated heat exchanger has to be brought into contact with the working medium discharged from the working chamber, while the remainder of the closed circuit from there onward can be positioned freely.

Within the meaning of the invention "layer by layer filling" means that substance mixture newly supplied to the storage container does not mix to any significant degree with storage medium already present but remains separate therefrom. During operation of the household appliance within the meaning of the invention the storage medium undergoes a phase transition when it is removed from the storage container and conducted through the heat exchanger. Layer by layer filling therefore ensures that regions of the substance mixture in the storage container, in which the storage medium is present in different phases, remain separate from one another. This allows the storage medium to be changed essentially completely from a solid to a liquid phase during a first half of a drying process operating in the household appliance and from the liquid to the solid phase during a subsequent second half. This allows the capacity for storage of the storage medium to be utilized to the best possible degree.

Within the context of the invention the household appliance is in particular a tumble dryer, in which laundry items accommodated in a working chamber and to be dried are dried by a working medium in the form of process air. Said tumble dryer can be embodied as an exhaust air dryer, in which the process air conducted out of the working chamber is conducted by way of the heat exchanger of the latent heat store and then out of the tumble dryer. It can also equally be a condensation dryer, in which the process air conducted out of the working chamber is conducted by way of the associated heat exchanger of the at least one latent heat store and then heated by way of a heater before being conveyed back into the working chamber. Both cited variants can be embodied as heat pump dryers, in which at least some of the process air conducted into the working chamber is heated by way of a heat pump.

Additionally the inventive household appliance can also be a washing machine or dishwasher. If it is embodied as a washing machine, water used to wash laundry items in a working chamber embodied as a tub is used as the working medium, the water then being conducted past the associated heat exchanger of the at least one latent heat store as it is pumped out of the tub. If it is embodied as a dishwasher, a working medium in the form of water is also conducted past the associated heat exchanger as it is pumped out of an interior space. The household appliance can also be a combination of washing machine and tumble dryer in the form of a washer/dryer.

When the inventive household appliance is embodied as a condensation dryer there is also the further advantage that a direct transfer of thermal energy to the process air flowing past can take place in a heat recovery process at the associated heat exchanger of the at least one latent heat store in addition to the heat coupling-in process, in other words the transfer of thermal energy to the storage medium. In the first instance therefore heat from the process air conducted past is transferred to the substance mixture, while conversely heat is transferred from the substance mixture to the process air flowing past. During the heat coupling-in process water from the process air conducted past is condensed out so that the heat exchanger of the at least one latent heat store also operates as a condenser.

It is particularly preferable here for a substance mixture to be used with a storage medium, the working temperature of which is in the range from 60° to 80° Celsius, in particular with narrow temperature ranges for heat emission in the solidification phase of the storage medium and a small hysteresis to melting temperature. This temperature range is within the range of the working temperature of the air conducted past the heat exchanger, so that during the heat coupling-in process the heat exchange results in a phase change of the storage medium, which is initially in the low temperature phase, and the condensing out of water, while sufficient heating of the air conducted past is achieved during the heat recovery process and the phase change of the storage medium undergone in the counter direction.

The heat sink and heat source must be operated according to the working temperature selected. Initially it may be desirable to supply process air to the heat exchanger at the highest temperature possible and in this process it can be advantageous to reduce or even completely prevent the extraction of heat from the process air in the heat sink. When the latent heat store is fully charged, the heat sink can operate with the highest possible output and extract heat from the process air so that it can heat up again as it flows through the heat exchanger. The emission of heat by the heat source can then be reduced or prevented, so that the heat exchanger takes over the heating of the process air more or less alone. This reduction of the function of the heat source is more markedly possible, the higher the temperature of the latent heat store; this is also why the quite high working temperature of the latent heat store of between 60° and 80° is preferred in the present context.

It is also conceivable in this context to provide a number of separate heat exchangers with assigned separate latent heat stores, the process air flowing through these heat exchangers one after the other and said heat exchangers undergoing their change of function between cooling and heating the process air at different time points.

In contrast in the household appliance according to DE 10 2009 046 547 A1 thermal coupling takes place between the air flowing past the associated heat exchanger and the storage medium of the latent heat store by means of cooling air, which exchanges heat with the process air by way of the heat exchanger and is then conducted through the latent heat store to emit the absorbed heat to the storage medium. Heat is therefore transferred indirectly from the process air to the storage medium of the latent heat store, thereby reducing efficiency. The latent heat store must also be arranged directly on the working chamber of the condensation dryer in order, when a latent heat store is fully charged, to emit the heat in this region to the working chamber and therefore in turn indirectly to the air flowing therethrough. The heat recovery process is therefore also subject to losses, as the air flowing into the working chamber is not heated directly but is simply warmed by the heated working chamber. The cold air flowing in can therefore only absorb a small quantity of moisture at the start, thereby slowing down the drying effect. Finally a corresponding space must be provided for the arrangement of the latent heat store in the region of the working chamber, which is problematic due to the limited space conditions in said region.

Within the meaning of the invention provision should be made with corresponding structural measures in particular for high circulation speeds and major turbulence in the region of the associated heat exchanger of the at least one latent heat store in each instance, in order to improve heat transfers between the substance mixture and the working medium conducted past. A further heat exchanger is also preferably connected upstream in the associated heat exchanger of the at least one latent heat store in each instance, this further heat exchanger being assigned to a further latent heat store. This further latent heat store then also has a storage medium in the form of a PCM, the thermal coupling of this further latent heat store to the working medium being realized by way of cooling air, which is conducted by way of the heat exchanger of the further latent heat store and flows through the latent heat store. However the further latent heat store can also be provided with a substance mixture formed from a storage medium and a carrier fluid.

In the context of the invention it is not only a matter of providing a latent heat store which is permanently incorporated and is not to be or cannot be removed during normal use of the household appliance. In the context of the invention it is also a matter of providing a latent heat store which is not permanently incorporated in the household appliance and can be removed by a familiar user of the household appliance in order to be charged with heat or to have heat discharged in another household appliance or a different application. The inventive household appliance could also have connectors, by means of which another household appliance or a different application could access the latent heat store or its content for corresponding purposes.

According to one advantageous embodiment of the invention the substance mixture is formed by suspending a microencapsulated or polymerized PCM in the carrier fluid or by emulsifying a PCM containing additives in the carrier fluid. In the first two instances a suspension of carrier fluid and a PCM introduced therein is therefore formed, while in the last instance a substance mixture is realized in the form of an emulsion. In all instances a respective type of phase change of the PCM is permitted in the carrier fluid without the respectively absorbed PCM being precipitated from the carrier fluid.

It is particularly preferable for the substance mixture to be formed as a gel, in other words as a viscous, paste-like preparation. In this form the substance mixture can be conveyed using a corresponding pump but it is ensured that the carrier fluid and storage medium cannot be separated due to precipitation of the storage medium. It also means that when substance mixture is reintroduced into the storage container, it does not mix with storage medium already there.

In one development of the invention the substance mixture circulates between the associated heat exchanger and at least one reservoir in the closed circuit. In particular this at least one reservoir is thermally insulated, so that the substance mixture which has already been conducted by way of the heat exchanger and flowed back into the reservoir does not already emit thermal energy absorbed in the region of the reservoir.

According to the invention the reservoir is again filled layer by layer with the substance mixture conducted by way of the associated heat exchanger. As a result of this layer by layer filling the latent heat store is always fully charged and discharged again, as mixing of the substance mixture already conducted by way of the heat exchanger with the mixture that has not yet been conveyed into this region for the exchange of heat is prevented by the layer by layer refilling.

According to a first preferred alternative in this respect the reservoir has an upper end and a lower end in respect of gravity and is set up for the discharging of the substance mixture at the lower end and for the supplying of the substance mixture at the upper end.

According to a second preferred alternative in this respect the reservoir has a movable inner wall, which separates the substance mixture that has already been conducted by way of the heat exchanger from the mixture still to be conveyed to this point.

According to a third preferred alternative in this respect a first and second reservoir are provided, the first reservoir being connected upstream of the associated heat exchanger in the conveying direction of the substance mixture and the second reservoir being connected downstream of the associated heat exchanger in the conveying direction. The second reservoir can also be emptied into the first reservoir. The substance mixture already conveyed by way of the associated heat exchanger can also be separated from the substance mixture still to be conveyed by way of the associated heat exchanger for an exchange of heat with the working medium, as the substance mixture removed from the first reservoir is conveyed into the second reservoir after being conducted by way of the associated heat exchanger and is therefore separated from the portion still in the first reservoir. Only when the second reservoir is emptied into the first reservoir can the substance mixture return there, whereupon it is available to be supplied again to the associated heat exchanger. Such emptying can be undertaken for example when the first reservoir has been fully or almost fully emptied and therefore almost all the substance mixture has already been conducted by way of the associated heat exchanger.

In one development of the invention the associated heat exchanger and the at least one reservoir are connected to one another by way of a line system in the respective closed circuit, a circulating pump being provided in said line system, which takes the substance mixture in from the at least one reservoir during operation and conducts it by way of the associated heat exchanger in each instance and also conveys it back into the at least one reservoir. A circulation speed can be set by way of said circulating pump, at which an optimum heat transfer takes place from the working medium to the substance mixture or vice versa. Within the meaning of the invention the circulating pump here is preferably embodied as a vane pump, gear wheel pump or the like.

According to a further preferred embodiment of the invention the associated heat exchanger is a plate heat exchanger, the plates of which have hydrophobic surfaces. When the inventive structure is applied in the region of a condensation dryer, moisture contained in the process air can therefore condense out on the plates of the plate heat exchanger, with a more efficient discharge of the resulting condensate taking place as a result of the hydrophobic surface properties of the plates. At the start of the heat recovery process this reduces any remoistening of the process air as a result of water adhering to the plates.

According to another preferred embodiment of the invention the heat sink is an air/air heat exchanger.

According to yet another preferred embodiment of the invention the heat source is an electric heater.

According to the invention the storage medium of the substance mixture is changed in a heat coupling-in process by heat from the working medium from a solid phase to a liquid phase during operation of the inventive household appliance, with a transition taking place to a heat recovery process after all or almost all the storage medium has changed to the liquid phase. To this end the heating of the working medium by way of a heat source of the household appliance is reduced or interrupted and the working medium is then heated at the associated heat exchanger by the storage medium which returns to the solid phase in the process. After all or almost all the storage medium has returned to the solid phase there is a return to the previous heat coupling-in process and the sequence starts again. In other words in a first process heat from the working medium is introduced into the substance mixture, with the storage medium present in the substance mixture in particular and preferably undergoing a phase transition from a solid phase to a liquid phase. When all the storage medium has been changed to the liquid phase, the heating of the working medium by way of a separately provided heat source of the household appliance is reduced or interrupted so that the working medium is then heated by way of the storage medium at the associated heat exchanger before being supplied back to the working chamber. In this so-called heat recovery process the storage medium returns to the first solid phase as a result of the emission of thermal energy, with a return to the heat coupling-in process and therefore the start of recharging of the latent heat store after all or almost all the storage medium has returned to the solid phase, in other words the at least one latent heat store has been fully discharged.

Within the meaning of the invention a charge state of the latent heat store is determined in particular by measuring the temperature in the region of a reservoir of the latent heat store, as when all the storage medium of the substance mixture has changed completely to the liquid phase, thermal energy in the form of tangible heat is absorbed by the carrier fluid, which can result in a perceptible temperature change in the substance mixture. A temperature sensor is preferably provided in the region of the reservoir for this purpose, detecting a temperature of the substance mixture already conducted by way of the associated heat exchanger.

The invention is not limited to the cited combination of features of the independent claims or dependent claims. There are also possibilities for combining individual features which emerge from the claims, the description of an embodiment which follows or directly from the drawing. Reference in the claims to the drawing using reference characters should also not restrict the scope of protection of the claims.

Further advantageous embodiments of the invention will emerge from the following description of a preferred embodiment of the invention, which refers to the FIGURE illustrated in the drawing.

The single FIGURE shows a schematic view of a household appliance according to a preferred embodiment, wherein said household appliance is a condensation dryer 1. This condensation dryer 1 has a working chamber 2 in the form of a drum, which is supported in such a manner that it can rotate about a horizontal axis in a housing 3 of the condensation dryer 1 and serves to accommodate laundry items to be dried. The working chamber 2 can be loaded from the front of the housing 3 by way of a loading opening, which can be closed by way of a door 4.

To dry the laundry present in the working chamber 2 during operation of the condensation dryer 1 process air is conducted through the working chamber 2 by way of a process air channel 6 by means of a fan 5. Shortly before entering the working chamber 2 said process air is conducted by way of a heat source 7 in the form of an electric heater and thus heated so that in the region of the working chamber 2 it absorbs moisture from the laundry therein and dries it. After flowing through the working chamber 2 the process air passes by way of a lint filter 8 back into the process air channel 6 in the region of the door 4 and is taken in by way of the fan 5.

As can also be seen from the single FIGURE a heat exchanger 9 of a latent heat store 10 is connected upstream of the fan 5, said heat exchanger 9 here preferably being embodied as a plate heat exchanger, the plates of which have hydrophobic surfaces. The latent heat store 10 here is specifically formed in such a manner that the heat exchanger 9 is connected to a reservoir 12 by way of a line system 11 in a closed circuit, with a substance mixture of the latent heat store 10 flowing in the closed circuit between heat exchanger 9 and reservoir 12, said substance mixture being formed from a carrier fluid with microencapsulated PCM (phase change material) suspended therein. The carrier fluid here is preferably water, while the PCM is present in the form of paraffins, which can undergo a phase change between solid and liquid during the exchange of heat with the process air within the carrier fluid. The substance mixture formed by the carrier fluid and the PCM here operates in a temperature range from 60° to 80° Celsius with narrow temperature ranges for the emission of heat in the phase change from liquid to solid and a small hysteresis to melting temperature. The substance mixture formed is circulated within the line system 11 between the heat exchanger 9 and the reservoir 12 by means of a circulating pump 13.

Removal from and filling of the reservoir 12 takes place here layer by layer in that it is provided with a movable inner wall (not shown in detail here) so that the substance mixture introduced at an upper face of the reservoir 12 does not mix with the substance mixture to be taken in by way of the circulating pump 13 at a lower face of the reservoir 12. As a result substance mixture already conducted by way of the heat exchanger 9 is only taken in again by the circulating pump 13 once the full quantity of substance mixture has been conducted by way of the heat exchanger 9.

At the start of a heat coupling-in process all the substance mixture is present in the reservoir 12 with PCM in a solid phase. The substance mixture is now taken in by way of the carrier fluid by means of the circulating pump 13 and conducted to the heat exchanger 9 where it enters into an exchange of heat with the process air conducted past in this region. Heat from the passing process air is transferred to the substance mixture at the heat exchanger 9, with moisture bound in the process air condensing out at the heat exchanger 9, while the PCM present in the carrier fluid absorbs said heat as the enthalpy of fusion and undergoes a phase change from the solid phase to a liquid phase. The melted PCM is then conducted back into the reservoir 12 at its upper face.

The heat coupling-in phase continues until all the PCM in the substance mixture has melted and therefore cannot absorb any more latent heat. This full charge state of the latent heat store 10 is detected with the aid of a temperature sensor 14, which is provided in the reservoir 12 and detects the rise of the substance mixture circulating by way of the line system 11, as when the thermal energy is absorbed as latent heat in the region of the heat exchanger 9, the temperature of the substance mixture does not change or only changes very slightly, as the thermal energy is used as the enthalpy of fusion to melt the PCM. However when all the PCM has melted, the thermal energy is also absorbed by the carrier fluid as tangible heat, so that the temperature of the substance mixture now changes in a detectable manner.

From this time point a switch is made from the heat coupling-in process to a heat recovery process, in that the heat source 7 is deactivated and the process air supplied to the working chamber 2 is now no longer heated before entry. As a result the air flowing into the process air guide 6 in the region of the door 4 and therefore also the air arriving at the heat exchanger 9 has a lower temperature, said temperature being below the melting temperature of the PCM from a specified time point. From this time point the process air flowing past the heat exchanger 9 is heated by way of the PCM, which in the process undergoes a phase change from the liquid phase to the solid phase, thereby returning to the solid phase. The hydrophobic surfaces of the heat exchanger 9 mean that at the start of the heat recovery process the process air conducted past the heat exchanger 9 cannot be remoistened due to the adhesion of water. The thermal energy supplied in each instance corresponds to the solidification enthalpy of the PCM. During the further progress of the heat recovery phase all the previously melted PCM in the substance mixture of the latent heat store 10 is used to heat process air conducted past the heat exchanger 9, the latent heat store 10 being discharged step by step in this process, in that the PCM returned to the solid phase is constantly conveyed back into the storage container 12 by way of the carrier fluid. From a specified time point all the PCM in the substance mixture is present in the solid phase again so the latent heat store 10 is fully discharged. The heat source 7 of the condensation dryer 1 is reactivated from this time point and as a result the process air is again heated electrically so that the process starts again with a heat coupling-in process.

The inventive embodiment of a household appliance and the inventive method therefore allow a latent heat store 10 of a condensation dryer 1 to be operated with a high level of efficiency and a constant dynamic. Storage performance and storage capacity can also be dimensioned separately from one another.

LIST OF REFERENCE CHARACTERS

1 Condensation dryer
2 Working chamber
3 Housing
4 Door
5 Fan
6 Process air channel
7 Heat source, heater
8 Lint filter
9 Heat exchanger
10 Latent heat store
11 Line system
12 Reservoir
13 Circulating pump
14 Temperature sensor
15 Heat sink, air/air heat exchanger
16 Cooling air channel
17 Cooling air fan

The invention claimed is:

1. A household appliance, comprising a working chamber and at least one latent heat store, having one storage medium in each instance, the one storage medium in each instance being thermally coupled by way of an associated heat exchanger in each instance to a working medium circulating through the working chamber, wherein working medium passes first from the working chamber to a heat sink, from there to the heat exchanger, from there to a heat source and from there back into the working chamber and wherein the one storage medium in each instance forms a substance mixture together with a carrier fluid in each instance, said substance mixture being able to be conducted in a closed circuit in each instance by way of the associated heat exchanger in each instance for an exchange of heat with the working medium, wherein the one substance mixture in each instance circulates between the associated heat exchanger in each instance and at least one reservoir in the respective closed circuit and the reservoir can be filled layer by layer with the substance mixture conducted by way of the associated heat exchanger in each instance.

2. The household appliance as claimed in claim 1, wherein the substance mixture in each instance is formed by suspending a microencapsulated or polymerized PCM in the one carrier fluid in each instance or by emulsifying a PCM containing additives in the one carrier fluid in each instance.

3. The household appliance as claimed in claim 1, wherein the substance mixture is a gel.

4. The household appliance as claimed in claim 1, wherein the reservoir has an upper end and a lower end in respect of gravity and is set up for the discharging of the substance mixture at the lower end and for the supplying of the substance mixture at the upper end.

5. The household appliance as claimed in claim 1, wherein the reservoir has a movable inner wall.

6. The household appliance as claimed in claim 1, wherein a first and second reservoir are provided, the first reservoir being connected upstream of the associated heat exchanger in each instance in the conveying direction of the substance mixture and the second reservoir being connected downstream of the associated heat exchanger in each instance in the conveying direction, it being possible for the second reservoir to be emptied into the first reservoir.

7. The household appliance as claimed in claim 1, wherein the associated heat exchanger in each instance and the at least one reservoir are connected to one another by way of a line system in the respective closed circuit, a circulating pump being provided in said line system, which takes the substance mixture in from the at least one reservoir during operation and conducts it by way of the associated heat exchanger in each instance and also conveys it back into the at least one reservoir.

8. The household appliance as claimed in claim 1, wherein the associated heat exchanger in each instance is a plate heat exchanger, the plates of which have hydrophobic surfaces.

9. The household appliance as claimed in claim 1, wherein the heat sink is an air/air heat exchanger.

10. The household appliance as claimed in claim 1, wherein the heat source is an electric heater.

11. The household appliance as claimed in claim 1, wherein the household appliance comprises a tumble dryer.

12. A method for operating a household appliance, wherein one storage medium of at least one latent heat store in each instance is thermally coupled by way of an associated heat exchanger in each instance to a working medium of the household appliance, wherein one storage medium in each instance is made to exchange heat with the working medium in that a substance mixture formed by the one storage medium in each instance and a carrier fluid in each instance is conducted in a respectively closed circuit by way of the associated heat exchanger,
wherein the substance mixture in each instance circulates between the associated heat exchanger and at least one reservoir in the closed circuit, and the reservoir is Tillable layer-by-layer with the substance mixture conducted by way of the associated heat exchanger.

13. The method as claimed in claim 12, wherein the one storage medium of the respective substance mixture in each instance is changed in a heat coupling-in process by heat from the working medium from a solid phase to a liquid phase, with a transition taking place to a heat recovery process after all or almost all the storage medium has changed to the liquid phase, in that the heating of the working medium by way of a heat source of the household appliance is interrupted and the working medium is then heated at the associated heat exchanger by way of the one storage medium which returns to the solid phase in the process and wherein, after all or almost all the storage medium has returned to the solid phase, there is a return to the heat coupling-in process.

14. The method as claimed in claim 12, wherein the household appliance comprises a tumble dryer.

15. A method for operating a household appliance having a working chamber and at least one latent heat store with a storage medium, each storage medium being thermally coupled by way of an associated heat exchanger to a working medium circulating through the working chamber, wherein the method includes passing working medium from the working chamber to a heat sink, from there to the heat exchanger, from there to a heat source and from there back into the working chamber, wherein the one storage medium in each instance forms a substance mixture together with a carrier fluid, said substance mixture being able to be conducted in a closed circuit by way of the associated heat exchanger for an exchange of heat with the working medium, wherein the one substance mixture in each instance circulates between the associated heat exchanger and at least one reservoir in the respective closed circuit and the reservoir can be filled layer by layer with the substance mixture conducted by way of the associated heat exchanger.

16. The method as claimed in claim 15, wherein the substance mixture in each instance is formed by suspending a microencapsulated or polymerized PCM in the one carrier fluid in each instance or by emulsifying a PCM containing additives in the one carrier fluid in each instance.

17. The method as claimed in claim 15, wherein the substance mixture is a gel.

18. The method as claimed in claim 15, wherein the reservoir has an upper end and a lower end in respect of gravity and is set up for the discharging of the substance mixture at the lower end and for the supplying of the substance mixture at the upper end.

19. The method as claimed in claim 15, wherein the reservoir has a movable inner wall.

20. The method as claimed in claim 15, wherein a first and second reservoir are provided, the first reservoir being connected upstream of the associated heat exchanger in each instance in the conveying direction of the substance mixture and the second reservoir being connected downstream of the associated heat exchanger in each instance in the conveying direction, it being possible for the second reservoir to be emptied into the first reservoir.

21. The method as claimed in claim 15, wherein the associated heat exchanger in each instance and the at least one reservoir are connected to one another by way of a line system in the respective closed circuit, a circulating pump being provided in said line system, which takes the substance mixture in from the at least one reservoir during operation and conducts it by way of the associated heat exchanger in each instance and also conveys it back into the at least one reservoir.

22. The method as claimed in claim 15, wherein the associated heat exchanger in each instance is a plate heat exchanger, the plates of which have hydrophobic surfaces.

23. The method as claimed in claim 15, wherein the heat sink is an air/air heat exchanger.

24. The method as claimed in claim 15, wherein the heat source is an electric heater.

25. The method as claimed in claim 15, wherein the household appliance comprises a tumble dryer.

* * * * *

UNITED STATES PATENT AND TRADEMARK OFFICE
CERTIFICATE OF CORRECTION

PATENT NO. : 9,752,275 B2
APPLICATION NO. : 14/380186
DATED : September 5, 2017
INVENTOR(S) : Stolze et al.

It is certified that error appears in the above-identified patent and that said Letters Patent is hereby corrected as shown below:

In the Claims

Claim 12, at Column 12, Line 8: "Tillable" should read "fillable".

Signed and Sealed this
Fourteenth Day of November, 2017

Joseph Matal
*Performing the Functions and Duties of the
Under Secretary of Commerce for Intellectual Property and
Director of the United States Patent and Trademark Office*